United States Patent [19]

Erickson

[11] Patent Number: 5,460,293
[45] Date of Patent: Oct. 24, 1995

[54] CAT LITTER SCOOP CONTAINERS

[76] Inventor: Kurt D. Erickson, P.O. Box 942, Whitefish, Mont. 59937

[21] Appl. No.: 260,252

[22] Filed: Jun. 14, 1994

[51] Int. Cl.[6] .................................................. B65D 81/26
[52] U.S. Cl. ..................... 220/735; 220/736; 206/204; 206/216
[58] Field of Search ........................... 206/204, 216, 206/15.2; 220/735, 736, 371; 211/13, 66, 60.1; 312/245, 206

[56] References Cited

U.S. PATENT DOCUMENTS

| | | | |
|---|---|---|---|
| 489,593 | 1/1893 | Ramer | 211/60.1 |
| 1,008,856 | 11/1911 | Mosher | 220/736 |
| 1,097,184 | 5/1914 | Mueller | 312/206 |
| 2,404,430 | 7/1946 | Brooks | 312/245 |
| 2,522,952 | 9/1950 | Krohn | 206/204 |
| 3,884,635 | 5/1975 | Sloan | 312/206 |
| 4,103,980 | 8/1978 | Silva | 312/245 |
| 4,326,761 | 4/1982 | Schwartz | 312/245 |

*Primary Examiner*—David T. Fidei

[57] ABSTRACT

A new and improved cat litter scoop container comprises a holder formed as a generally hollow box with an open front. The holder has vertically positioned sidewalls and a vertically positioned rear wall. The holder also includes a roof and a floor. A front cover is formed in a long hollow shaped configuration with an upper region and a lower region. The lower region has a generally linear horizontal edge at its lowermost extent. The cover is contoured to be positioned within the front edges of the sidewalls of the holder in the operative orientation. A hinge is positioned between the holder and front cover and is affixed to both. The hinge is adapted to permit rotational opening and closing of the front cover.

5 Claims, 4 Drawing Sheets

CAT LITTER SCOOP CONTAINERS

BACKGROUND OF THE INVENTION

1. Field of the Invention

The present invention relates to cat litter scoop containers and more particularly pertains to storing the cat litter scoop in the conveniently located, tightly sealed holder to prevent odors from entering the surrounding living areas.

2. Description of the Prior Art

The use of sanitary containers is known in the prior art. More specifically, sanitary containers heretofore devised and utilized for the purpose of storing foul smelling objects and their associated odors therein are known to consist basically of familiar, expected, and obvious structural configurations, notwithstanding the myriad of designs encompassed by the crowded prior art which has been developed for the fulfillment of countless objectives and requirements.

By way of example, the prior art discloses U.S. Pat. No. 3,425,587 to Duross an elongated hinged container and method of forming same.

U.S. Pat. No. 4,733,794 to Kent discloses a hinged plastic container.

U.S. Pat. No. 5,076,627 to Simon discloses a scoop for cat litter.

Lastly, U.S. Pat. No. Des. 263,512 to Kawada discloses the ornamental design for a litter scoop and sacker.

In this respect, the cat litter scoop containers according to the present invention substantially depart from the conventional concepts and designs of the prior art, and in doing so provide an apparatus primarily developed for the purpose of storing the cat litter scoop in the conveniently located, tightly sealed holder to prevent odors from entering the surrounding living areas.

Therefore, it can be appreciated that there exists a continuing need for new and improved cat litter scoop containers which can be used for storing the cat litter scoop in the conveniently located, tightly sealed holder to prevent odors from entering the surrounding living areas. In this regard, the present invention substantially fulfills this need.

SUMMARY OF THE INVENTION

In view of the foregoing disadvantages inherent in the known types of sanitary containers now present in the prior art, the present invention provides an improved cat litter scoop container. As such, the general purpose of the present invention, which will be described subsequently in greater detail, is to provide a new and improved cat litter scoop container and method which has all the advantages of the prior art and none of the disadvantages.

To attain this, the present invention essentially comprises a new and improved cat litter scoop container comprising a holder formed as a generally rectangular shaped hollow box. The holder has a roof, a floor, a long rear wall, two long sidewalls and an open front. The roof includes a centrally located, downwardly extending semi circular shaped hook. The roof also includes a centrally located concave groove near its front edge. The sidewalls have an upper extent and a lower extent. The lower extent of each sidewall includes a rounded frontwardly extending member. The approximate center point of each member includes a generally circular shaped bore. The front edge of the floor includes a short upwardly extending ledge spanning its entire width and formed contiguously with the sidewalls. The holder is adapted to store a cat litter scoop in the operative orientation. A front cover has an upper region formed in a hollow generally semi elliptical shaped configuration, and a lower region formed in a generally rectangular configuration. The uppermost extent of the upper region includes a short rearwardly extending peg at its approximate center point. The peg includes a semicircular shaped impression at its furthest rearward extent. The lower region has a rounded frontward surface. Each side of the lower region includes a section having a smaller width than the remainder thereof. The sections are contoured and adapted to be positioned within the semi circular members of the holder. The smaller width sections each include generally cylindrical shaped projections which are positioned in the bores in the semi circular shaped members of the holder. The projections and bores form a hinge to permit rotational opening and closing of the cover. The lower region has a short generally linear front horizontal edge at its lowermost extent. The front horizontal edge has a smaller thickness than the area thereabove. The portions of the lower region which have smaller thicknesses are adapted to be positioned inside the holder in the operative closed orientation. The lower region also includes a plurality of generally rectangular shaped holes on its rounded frontward surface. A rectangular shaped bracket is affixed in a vertical orientation to each side of the series of holes. A replaceable charcoal filter is positioned within the brackets of the cover, behind the holes. The filter is adapted to allow fresh air into the holder while preventing odor from escaping. A scoop has a long planar rectangular handle and a wide generally rectangular shaped shovel. The handle has an outboard end and an inboard end. The outboard end includes an aperture near its furthest extent. The shovel is formed in a generally rectangular configuration with an outboard edge, an inboard edge, two parallel side edges, an upper surface and a lower surface. The shovel includes a plurality of generally rectangular shaped apertures which extend therethrough. The apertures are adapted to permit the siphoning of cat litter while retaining the animal waste products for disposal. The center point of the inboard edge is affixed to the inboard end of the handle. The remainder of the inboard edge is slanted away from the handle in an outboard direction. The inboard edge and side edges of the handle include a short sidewall which extends from its upper surface. The height of the sidewall is greater at the inboard edge than at the outboard edge, with a gradually decreasing height therebetween. The scoop is adapted to aid a user in removal of cat litter from a litter box.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved cat litter scoop containers which have all the advantages of the prior art sanitary containers and none of the disadvantages.

It is another object of the present invention to provide new and improved cat litter scoop containers which may be easily and efficiently manufactured and marketed.

It is further object of the present invention to provide new and improved cat litter scoop containers which are of durable and reliable constructions.

An even further object of the present invention is to provide new and improved cat litter scoop containers which are susceptible of a low cost of manufacture with regard to both materials and labor, and which accordingly are then susceptible of low prices of sale to the consuming public, thereby making such cat litter scoop containers economically available to the buying public.

Still yet another object of the present invention is to provide new and improved cat litter scoop containers which provide in the apparatuses and methods of the prior art some of the advantages thereof, while simultaneously overcoming some of the disadvantages normally associated therewith.

Still another object of the present invention is to store the cat litter scoop in the conveniently located, tightly sealed holder to prevent odors from entering the surrounding living areas.

Lastly, it is an object of the present invention to provide new and improved cat litter scoop containers comprising a holder formed as a generally hollow box with an open front. The holder has vertically positioned sidewalls and a vertically positioned rear wall. The holder also includes a roof and a floor. A front cover is formed in a long hollow shaped configuration with an upper region and a lower region. The lower region has a generally linear horizontal edge at its lowermost extent. The cover is contoured to be positioned within the front edges of the sidewalls of the holder in the operative orientation. A hinge is positioned between the holder and front cover and is affixed to both. The hinge is adapted to permit rotational opening and closing of the front cover.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
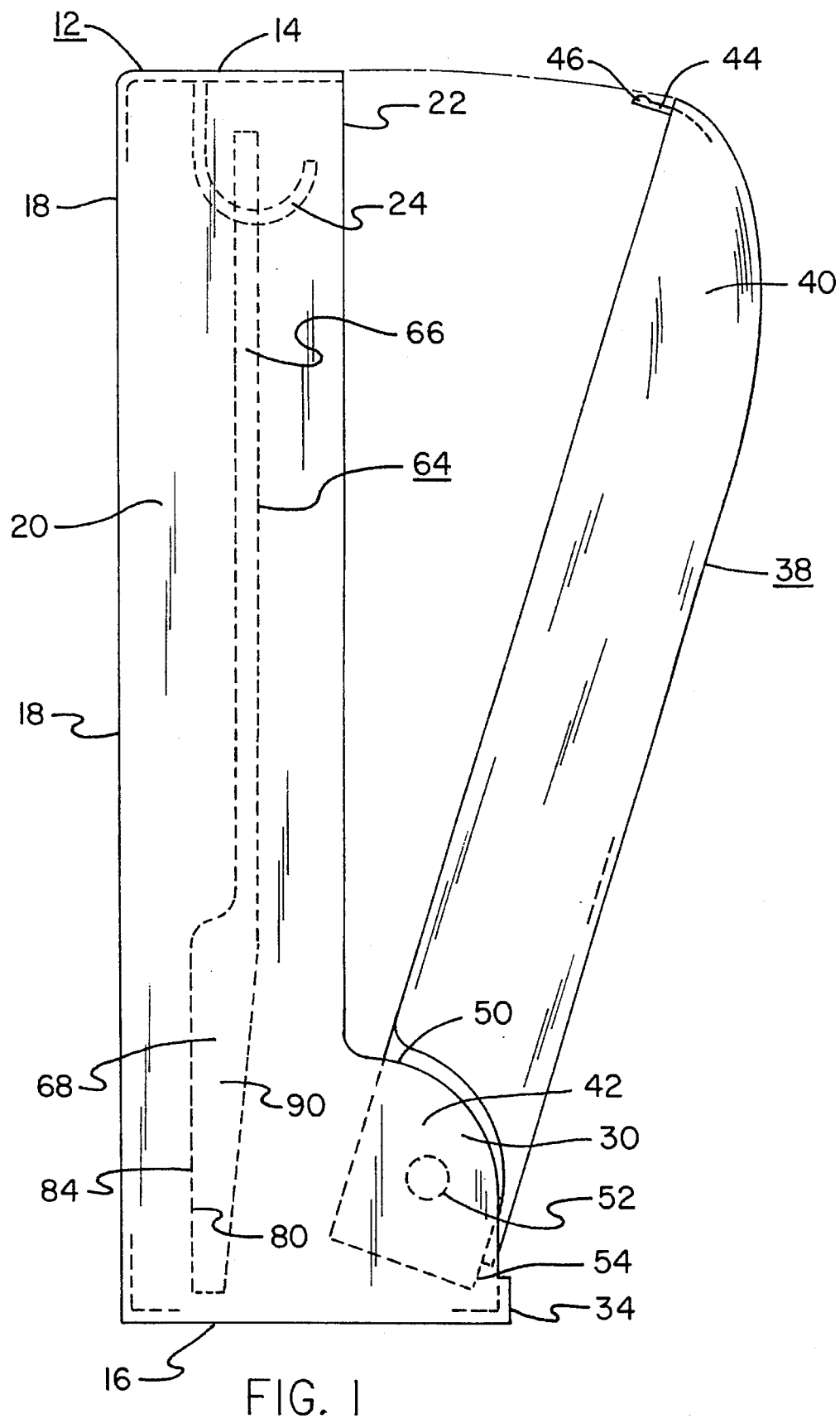
FIG. 1 is a perspective view of the preferred embodiment of the cat litter scoop container constructed in accordance with the principles of the present invention.
Figure 2:
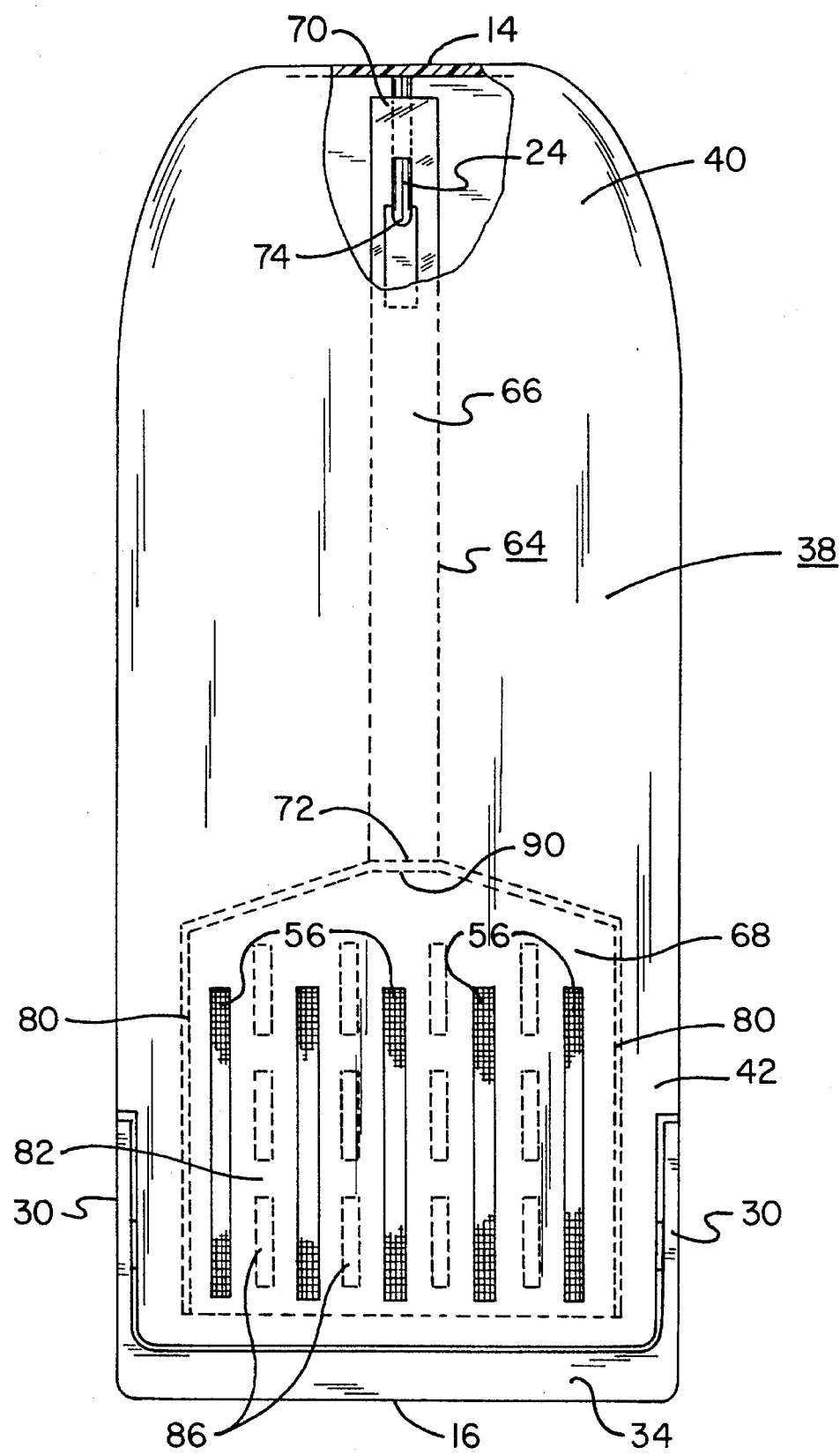
FIG. 2 is a partially broken away front perspective view of the cat litter scoop container.
Figure 3:
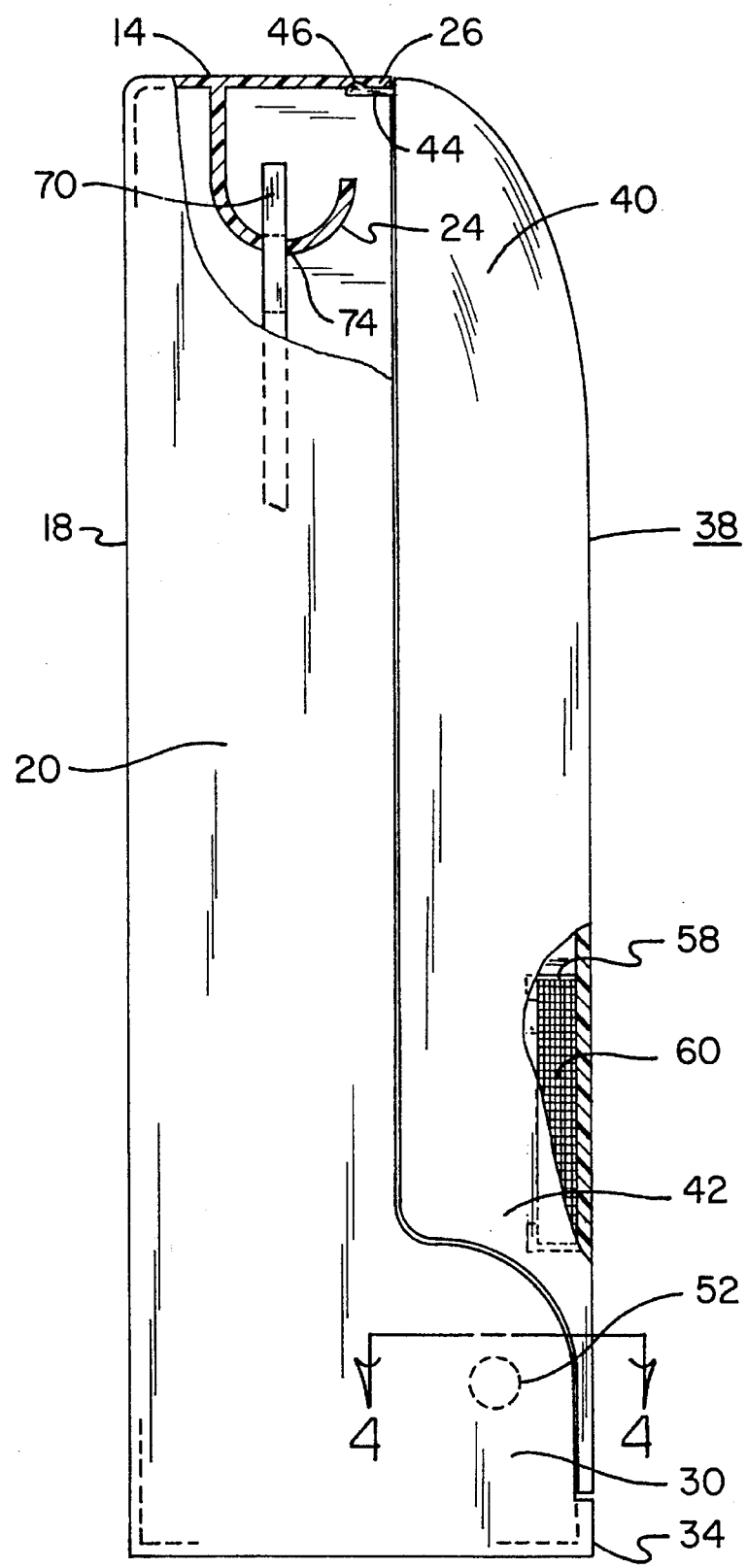
FIG. 3 is a partially broken away side perspective view of the cat litter scoop container.
Figure 4:
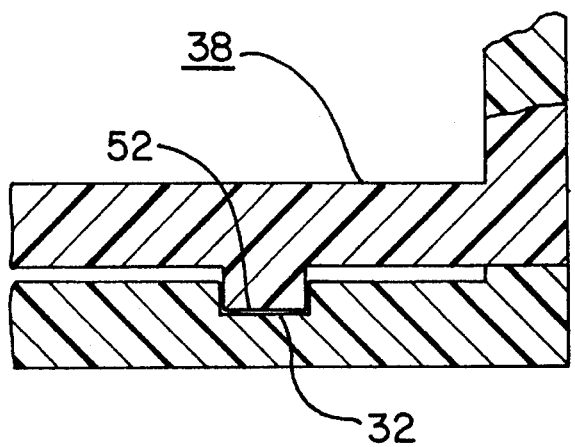
FIG. 4 is a cross-sectional view of the cat litter scoop container taken along line 4—4 of FIG. 3 illustrating the hinge of the apparatus.
Figure 5:
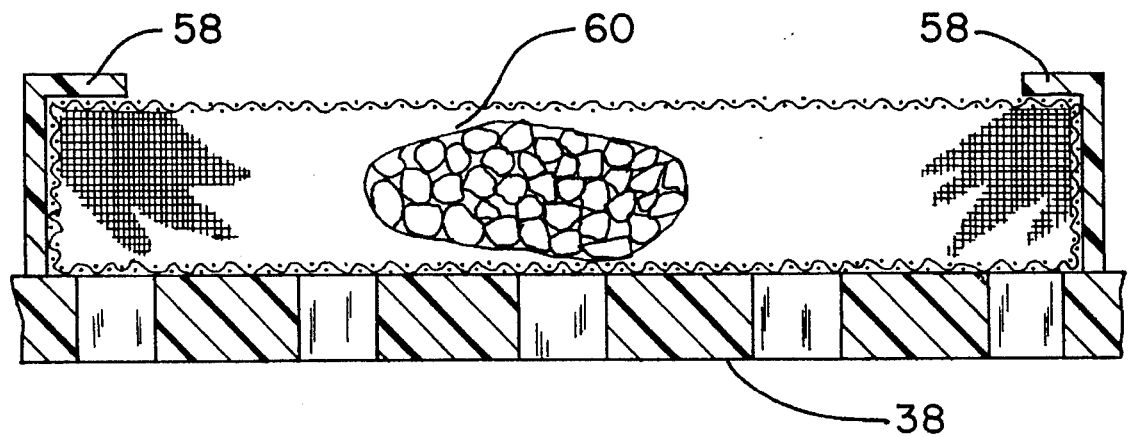
FIG. 5 is a cross-sectional view of the front cover of the cat litter scoop container illustrating the charcoal filter of the apparatus.

With reference now to the drawings, and in particular to FIG. 1 thereof, the preferred embodiment of the new and improved cat litter scoop containers embodying the principles and concepts of the present invention and generally designated by the reference numeral 10 will be described.

Specifically, it will be noted in FIGS. 1 through 5, that there is provided a new and improved cat litter scoop container. The cat litter scoop containers 10, in its broadest context, comprises a holder 12, a front cover 38, a scoop 60 and a charcoal filter 64. Each of the individual components is specifically configured and correlated one with respect to the other to attain the desired objectives.

More specifically, the holder 12 has a roof 14, a floor 16, a long rear wall 18, two long sidewalls 20 and an open front 22. The roof includes a centrally located, downwardly extending semi circular shaped hook 24. The hook is adapted to support a scoop thereupon. The roof also includes a centrally located concave groove 26 near its front edge. Note FIGS. 1, 2 and 3.

The sidewalls have an upper extent and a lower extent. The lower extent of each sidewall includes a rounded frontwardly extending member 30. The members extend frontwardly a short distance. The approximate center point of each member includes a generally circular shaped bore 32. The bore extends into each member a short distance. The front edge of the floor includes a short upwardly extending ledge 34 spanning its entire width and formed contiguously with the sidewalls. The ledge helps to ensure a tight fit with the cover in the closed orientation. The holder 12 is adapted to store a cat litter scoop in the operative orientation. Note FIGS. 2 and 3.

A front cover 38 has an upper region 40 formed in a hollow generally semi elliptical shaped configuration, and a lower region 42 formed in a generally rectangular configuration. The rearward open edge of the front cover is adapted to fit snugly upon the front edge of the holder. The uppermost extent of the upper region includes a short rearwardly extending peg 44 at its approximate center point. The peg includes a semicircular shaped impression 46 at its furthest rearward extent. The peg is adapted to lock into the grove in the roof of the holder in the closed orientation. To open the cover the user simply pushes down on the uppermost extent to dislodge the peg from the groove. Note FIGS. 1 and 3.

The lower region has a rounded frontward surface. Each side of the lower region includes a section 50 having a smaller width than the remainder thereof. The sections 50 are contoured and adapted to be positioned within the semi circular members of the holder. The smaller width allows the lower region of the cover to fit inside the holder between the frontwardly projecting members. The smaller width sections 50 each include generally cylindrical shaped projections 52 which are positioned in the bores in the semi circular shaped members of the holder. The projections 52 and bores 32 form a hinge to permit rotational opening and closing of the cover. Note FIG. 4. The smaller width provides sufficient clearance for the rotational movement. Note FIGS. 1 and 3.

The lower region has a short generally linear front horizontal edge 54 at its lowermost extent. The front horizontal edge 54 has a smaller thickness than the area thereabove. The portions 50, 54 of the lower region which have smaller thicknesses are adapted to be positioned inside the holder in the operative closed orientation. The smaller width provides sufficient clearance for rotational movement of the cover within the holder. Note FIG. 1.

The lower region of the cover also includes a plurality of generally rectangular shaped holes 56 on its rounded frontward surface. A rectangular shaped bracket 58 is affixed in a vertical orientation to each side of the series of holes. A replaceable charcoal filter 60 is positioned within the brackets of the cover, behind the holes 56. The brackets are configured to permit the easy removal and replacement of a filter when necessary. The filter is adapted to allow fresh air into the holder while preventing odor from escaping. Note FIGS. 3 and 5.

A scoop 64 has a long planar rectangular handle 66 and a wide generally rectangular shaped shovel 68. The handle 66 has an outboard end 70 and an inboard end 72. The outboard end includes an aperture 74 near its furthest extent. The aperture allows the user to hang the scoop on the hook in the holder after usage. The shovel is formed in a generally rectangular configuration with an outboard edge 76, an inboard edge 78, two parallel side edges 80, an upper surface 82 and a lower surface 84. The shovel includes a plurality of generally rectangular shaped apertures 86 which extend therethrough. The apertures 86 are adapted to permit the siphoning of cat litter while retaining the animal waste products for disposal. The apertures are large enough for litter to fall through but too small for the animal waste to fall through. Note FIG. 2.

The center point 90 of the inboard edge is affixed to the inboard end 72 of the handle. The handle and the shovel are comprised of sturdy materials to ensure against bending or breaking of the apparatus during use. The remainder of the inboard edge is slanted away from the handle in an outboard direction. The inboard edge and side edges of the handle include a short sidewall 92 which extends from its upper surface. The height of the sidewall is greater at the inboard edge than at the outboard edge, with a gradually decreasing height therebetween. The sidewalls prevent the spillage of unsiphoned litter when utilizing the apparatus. The scoop is adapted to aid a user in removal of cat litter from a litter box. Note FIGS. 1 and 2.

One of the messiest problems with cleaning or changing a dirty cat litter pan is what to do with the litter scoop when it is not being used. Since it is dirty and smelly, most people want to keep it out of the way but also want to keep it conveniently near the litter pan. People often stick it back in the pan, lean it against the wall next to the pan, or even toss it under the sink. The cat litter scoop container is the perfect solution to this messy problem.

The apparatus is a plastic container designed to hold a litter scoop when it is not being used. It is somewhat similar in appearance to the containers for holding toilet bowl brushes. The cat litter scoop container consists of four sections, a holder, a front cover, a scoop and a charcoal filter. The front cover is pulled away from the back section pulling forward on the top center region of the front edge. A series of small vents is located across the lower front region of the container to allow fresh air into the container. A small replaceable charcoal filter behind the vents prevents odor from escaping out into the room. The back section of the container has a hook inside the top on which to hang the apparatus. With the cat litter scoop containers, the scoop can be placed anywhere that is convenient without the owner having to worry about the smell and unsanitary condition of the scoop.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved cat litter scoop container comprising, in combination:

a holder formed as a generally rectangular shaped hollow box, the holder having a roof, a floor, a long rear wall, two long sidewalls and an open front, the roof including a centrally located downwardly extending semi circular shaped hook, the roof also including a centrally located concave groove near its front edge, the sidewalls having an upper extent and a lower extent, the lower extent of each sidewall including a rounded frontwardly extending member, the approximate center point of each member including a generally circular shaped bore, the front edge of the floor including a short upwardly extending ledge spanning its entire width and formed contiguously with the sidewalls, the holder adapted to store a cat litter scoop in the operative orientation;

a front cover, the cover having an upper region formed in a hollow generally semi elliptical shaped configuration and a lower region formed in a generally rectangular configuration, the uppermost extent of the upper region including a short rearwardly extending peg at its approximate center point, the peg including a semicircular shaped impression at its furthest rearward extent, the lower region having a rounded frontward surface, each side of the lower region including a section having a smaller width than the remainder thereof, the sections being contoured and adapted to be positioned within the semi circular members of the holder, the smaller width sections each including generally cylindrical shaped projections positioned in the bores in the semi circular shaped members of the holder, the projections and bores forming a hinge to permit rotational opening and closing of the cover, the lower region having a short generally linear front horizontal edge at its lowermost extent, the front horizontal edge having a smaller thickness than the area thereabove, the portions of the lower region having smaller thicknesses being adapted to be positioned inside the holder in the operative closed orientation, the lower region also including a plurality of generally rectangular shaped holes on its rounded frontward surface, a rectangular shaped bracket being affixed in a vertical orientation to each side of the series of holes;

a replaceable charcoal filter being positioned within the brackets of the cover behind the holes, the filter adapted to allow fresh air into the holder while preventing odor from escaping; and a scoop having a long planar rectangular handle and a wide generally rectangular shaped shovel, the handle having an outboard end and an inboard end, the outboard end including a an aperture near its furthest extent, the shovel being formed in a generally rectangular configuration with an outboard edge, an inboard edge, two parallel side edges, an upper surface and a lower surface, the shovel including a series of generally rectangular shaped apertures extending therethrough, the apertures adapted to permit the siphoning of cat litter while retaining waste products for disposal, the center point of the inboard edge being affixed to the inboard end of the handle, the remainder of the inboard edge being slanted away from the handle in an outboard direction, the inboard edge and side edges of the handle including a short sidewall extending from its upper surface, the height of the sidewall being greater at the inboard edge than at the outboard edge with a gradually decreasing height therebetween, the scoop adapted to aid a user in removal of cat litter from a litter box.

2. A cat litter scoop container comprising:

a holder formed as a generally hollow box with an open front, the holder having vertically positioned sidewalls and a vertically positioned rear wall, each wall having an interior surface and an exterior surface, the interior surface including an odor absorbing device to prevent the escape of odors therefrom with the apparatus in the closed orientation, the holder also including a roof and a floor; and a front cover formed in a long hollow shaped configuration with an upper region and a lower region, the lower region having a generally linear horizontal edge at its lowermost extent, the cover contoured to be positioned within the front edges of the sidewalls of the holder in the operative orientation, a hinge being positioned between the holder and front cover and affixed to both, the hinge adapted to permit rotational opening and closing of the front cover, the apparatus adapted to store a cat litter scoop therein.

3. The container as set forth in claim 2 wherein the cover includes a series of holes, a rectangular shaped bracket being affixed in a vertical orientation to each side of the series of holes, the odor absorbing device being a replaceable charcoal filter positioned within the brackets behind the holes, the filter adapted to allow fresh air into the holder while preventing odor from escaping.

4. The container as set forth in claim 2 wherein the roof includes a downwardly extending semi circular shaped hook.

5. The container as set forth in claim 4. and further including a scoop having a long planar rectangular handle and a wide generally rectangular shaped shovel, the shovel having a flat outboard edge and upturned inboard and side edges, the handle having an aperture at its furthest outboard extent.

* * * * *